(12) United States Patent
Hollstein et al.

(10) Patent No.: US 7,876,052 B2
(45) Date of Patent: Jan. 25, 2011

(54) GAS DISCHARGE LAMP COMPRISING A HELICOID DISCHARGE TUBE AND AN INNER TUBE PIECE

(75) Inventors: Andreas Hollstein, Karlskron (DE); Thomas Noll, Kipfenberg (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 534 days.

(21) Appl. No.: 10/592,790

(22) PCT Filed: Apr. 13, 2005

(86) PCT No.: PCT/DE2005/000665

§ 371 (c)(1),
(2), (4) Date: Dec. 14, 2006

(87) PCT Pub. No.: WO2005/101453

PCT Pub. Date: Oct. 27, 2005

(65) Prior Publication Data

US 2007/0176560 A1    Aug. 2, 2007

(30) Foreign Application Priority Data

Apr. 14, 2004   (DE) .................. 10 2004 018 104

(51) Int. Cl.
*H01K 1/28* (2006.01)
(52) U.S. Cl. ...................................... 313/634; 313/573

(58) Field of Classification Search ......... 313/634–643, 313/567–573
See application file for complete search history.

(56) References Cited

U.S. PATENT DOCUMENTS

| 3,536,947 | A | * | 10/1970 | Tadatoshi et. al. | 313/485 |
| 5,055,738 | A | * | 10/1991 | Yorifuji et al. | 313/490 |
| 5,243,256 | A | * | 9/1993 | Holzer | 313/493 |
| 5,568,008 | A | * | 10/1996 | Narita | 313/113 |
| 5,703,440 | A |  | 12/1997 | Kachmarik et al. | |
| 2003/0151350 | A1 | * | 8/2003 | Xu | 313/485 |
| 2005/0068775 | A1 | * | 3/2005 | Iida et al. | 362/260 |
| 2005/0168146 | A1 | * | 8/2005 | Xu et al. | 313/631 |
| 2006/0108908 | A1 | * | 5/2006 | Nakanishi et al. | 313/318.01 |

FOREIGN PATENT DOCUMENTS

| EP | 0 772 219 | 5/1997 |
| EP | 1 056 119 | 11/2000 |
| EP | 1 329 932 | 7/2003 |
| WO | 2004/081969 | 9/2004 |

* cited by examiner

*Primary Examiner*—Joseph L Williams
*Assistant Examiner*—Fatima N Farokhrooz

(57) ABSTRACT

The invention relates to a novel compact fluorescent lamp with a helical discharge tube 2 and a tube piece 8 which is fitted to it and can serve to accommodate an Hg source 14 and also as an exhaust tube, and to a corresponding production process.

15 Claims, 4 Drawing Sheets

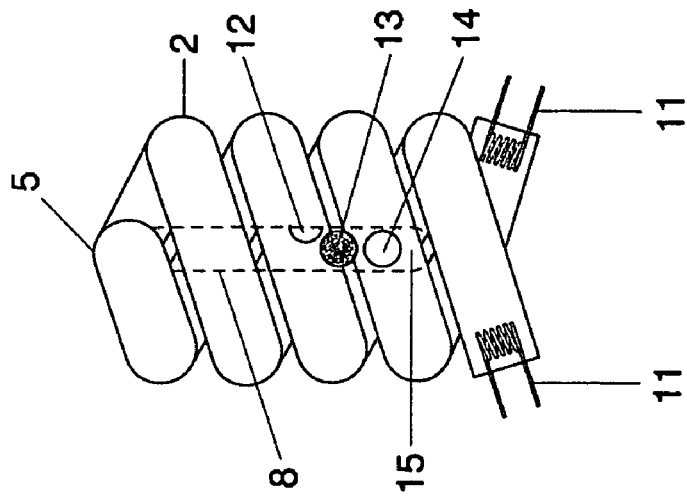
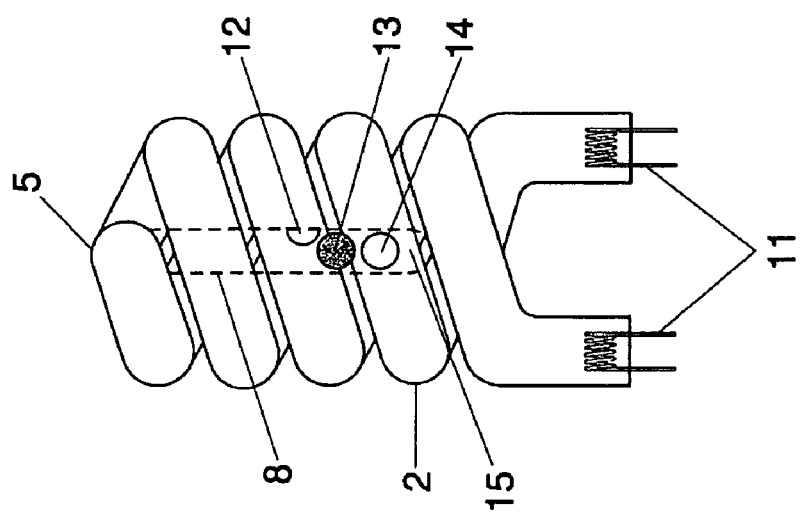
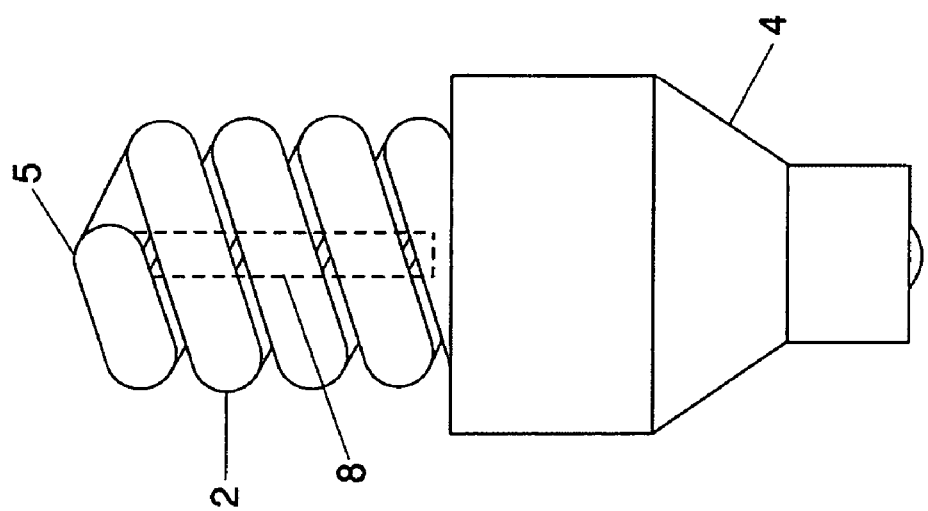

GAS DISCHARGE LAMP COMPRISING A HELICOID DISCHARGE TUBE AND AN INNER TUBE PIECE

TECHNICAL FIELD

The present invention relates to a gas discharge lamp and to an associated production process.

PRIOR ART

In recent years, gas discharge lamps have been used extensively, in particular in the form of compact fluorescent lamps. Technical development in this field is directed, inter alia, at an ongoing reduction in the overall size of the lamp. Both gas discharge lamps with integrated electronic ballast or for connection to a separate electronic ballast are customary. In one possible form of a compact fluorescent lamp, the prior art aims to provide a combination of a defined total length of a discharge tube forming the discharge vessel, on the one hand, and a compact overall size, on the other hand, by using a helically wound shape for at least part of the discharge tube. There are structural forms with two helix turns, i.e. two discharge tube parts which are in each case wound helically starting from a discharge tube end provided with the connection to or for the electronic ballast and which are referred to below as a double helix for the sake of simplicity. However, there are also structural forms with a helically wound discharge tube part, with the other discharge tube part returned, inside this helix shape, to a connection to or for the electronic ballast. This overall form is to be referred to below as a single helix. However, the invention is directed in general terms at gas discharge lamps, in particular compact fluorescent lamps having a discharge tube which is at least partially wound helically.

Conventional discharge lamps have an Hg source in the discharge vessel, from which, in operation, a suitable quantity of Hg is vaporized and makes a significant contribution, by virtue of the corresponding Hg lines (primarily 185/254 nm) to the generation of UV in the discharge vessel. Since the element Hg is very important as a constituent of the discharge medium which is crucial to the generation of UV, for the sake of simplicity the text which follows will continue to refer to an Hg source even though the invention relates in its broadest sense to any form of a solid or liquid source of a substance in the discharge vessel which is of relevance to the generation of light. In principle, the term Hg source in this case fundamentally encompasses two functions, namely firstly that of an Hg donor. This is a material or body which contains the Hg, for example liquid Hg itself, an Fe pill, an amalgam, etc. Furthermore, however, there are also Hg elements which control the vapor pressure and are often designed to be independent, for example working amalgams, Hg deposits at a cold spot, etc.

To produce defined conditions for the vapor pressure of the Hg which prevails in operation, it is necessary to use an element which controls the vapor pressure (amalgam or cold spot). The temperature of the element which controls vapor pressure controls the vapor pressure of the Hg in the discharge. This is true in particular if the element which controls the vapor pressure is a cold spot.

Furthermore, it is known to provide relatively thin exhaust tube fittings in the region of the discharge tube ends, which exhaust tube fittings on the one hand serve as an exhaust tube during production of the gas discharge lamp, i.e. to evacuate and fill the discharge vessel, and on the other hand often also accommodate the Hg source. The latter is therefore accommodated in a thinner tube fitting which protrudes from one of the discharge tube ends, generally into the electronic ballast or its housing.

In addition to the aspects discussed, the shape and design of gas discharge lamps are often subject to further design criteria, inter alia relating to the radiation of light, ease of handling, esthetic appearance, etc.

SUMMARY OF THE INVENTION

The present invention is based on the technical problem of providing an improved discharge lamp having a discharge tube which is helical in the manner described.

The invention is directed at a gas discharge lamp having a discharge tube which is at least partially wound helically around an axial free space, and a tube piece which is fitted to the discharge tube, characterized in that the tube piece extends inside the helix shape.

In addition, the invention also relates to a corresponding process for producing this gas discharge lamp.

Preferred configurations of the invention are given in the dependent claims.

The invention is distinguished by a tube piece which is arranged in the axial free space left clear by the helical shape of the discharge tube. This tube piece does not disrupt the external appearance of the lamp, at least to the extent that it is within the axial free space. It only increases the overall size of the lamp to the extent that the axial free space may be slightly larger on account of the tube piece. However, on account of the circumference of the helix which is required for the overall discharge length in the discharge tube, conventional helical discharge tubes generally already have a sufficient axial free space. The tube piece according to the invention offers an additional degree of freedom with regard to various technical aspects of the discharge lamp.

It is important to note that the tube piece according to the invention itself is not part of the discharge tube, i.e. in particular does not form one end of the discharge tube with an electrode inside it. Rather, it is fitted to the discharge tube, i.e. branches off from the latter, without itself being part of the discharge path between the electrodes. Only in this way can the advantages of the invention which are explained below be utilized without restriction.

Firstly, it can be used to accommodate an Hg source, in particular an element which controls vapor pressure. According to the invention, this element should extend inside the helix shape of the discharge tube and in particular the Hg source itself should be arranged inside the helix shape. Unlike in the prior art, where locations arranged outside the discharge tubes are fundamentally preferred for the Hg source which controls the vapor pressure, this configuration of the invention provides for the Hg source to be surrounded to a certain extent by the helix shape of the discharge tube. For this purpose, the associated tube piece is extended into the axial free space left clear by the helix shape, but does not necessarily have to completely fill this space.

The inventors have determined two major advantages.

Firstly, the Hg source in the position according to the invention is exposed in particular to the thermal radiation evolved by the discharge after the lamp has been switched on and possibly also to thermal conduction. It follows from this that the Hg source, after it has been switched on, is relatively quickly heated to its final operating temperature, and therefore the desired Hg vapor pressure is quickly stabilized in the discharge. The discharge lamp according to the invention therefore starts up more quickly and is stabilized more quickly.

Secondly, the operating temperature of the Hg source which controls the vapor pressure, in the lamp according to the invention, can be made more independent of fluctuations in operation and/or use-dependent parameters. In particular the ambient temperature plays less of a role, since the Hg source is much more strongly influenced by the heat emitted by the discharge tube itself and is to a certain extent shielded from the environment by this tube. The temperature of the ballast, which for its part may be dependent on the ambient temperature and/or may rise more slowly than the temperature of the discharge tube, also plays less of a role.

Finally, it has emerged that in discharge lamps according to the invention the installation position, i.e. the question of the direction in which the lamp faces in relation to the direction of gravity in its installed state, and whether it is installed in an upwardly open, laterally open or even downwardly open luminaire, has less influence. For example, in the case of conventional discharge lamps having an exhaust tube with an Hg source controlling the vapor pressure arranged in the ballast housing, it was important, for example, whether the discharge tube was arranged above or below the Hg source and whether the lamp was well cooled at the top through an opening in the luminaire or was heated to a greater extent, for example in a downlighter. Therefore, the invention can predict the temperature of the Hg source in use more accurately than in the prior art and can therefore effect optimized matching. This offers advantages in particular in luminaire design, since this provides greater degrees of freedom on account of the fact that less account need be taken of the thermal consequences of the installation position.

Another possible option consists in using the tube piece according to the invention as an exhaust tube for evacuating and filling the discharge vessel during production of the lamp. In particular, it is also possible for other exhaust tubes, for example conventional thin exhaust tubes at the ends of the discharge tube in the vicinity of the electrodes, to be omitted altogether. However, the tube piece according to the invention as an exhaust tube may also be provided in addition to conventional exhaust tubes of this type. There is the option of providing a considerably greater exhaust cross section than is the case with conventional exhaust tubes, which in terms of their structure still have to take account of the adjacent electrode and moreover must fit into the cross section of the discharge tube itself, i.e. must have a considerably smaller diameter than the latter. By contrast, the tube piece according to the invention may have a relatively large diameter, even up to the range of the diameter of the discharge tube itself.

If it is used together with one or more other exhaust tubes, it also offers additional options for purging the discharge vessel. Furthermore, the tube piece, by virtue of having a sufficiently large cross section, can offer good access possibilities to the discharge vessel, for example for introduction of the Hg source. This relates firstly to the introduction of an Hg donor. Secondly, however, the tube piece can also be used to place a starting amalgam directly in the gas discharge.

Finally, the invention can also be used by employing the tube piece according to the invention as a holder, for example in order to hold the discharge vessel when fitting pinches, which are inherently conventional, at the ends of the discharge tube. In particular, it is known in practice that the winding process, i.e. the production of the helix shape, is subject to considerable tolerances. Consequently, the helix was always difficult to handle in production. This is made significantly simpler by the holding at the tube piece according to the invention.

A preferred geometry of the invention provides for the tube piece to be fitted to the discharge tube at one end of the helix shape, i.e. in the front or rear region of the helix, as seen in the axial direction, and from this position to extend substantially axially parallel within the helix shape. In this context, it is preferable in particular for the tube piece, starting from that part of the helix shape which is remote from the electronic ballast in operation (i.e. at the top when the lamp is in an upright position), to run axially parallel, in particular axially, within the helix shape in the direction toward the part which is closer to the electronic ballast in operation. It is preferably substantially straight.

In particular, it is also preferred for the double helix shape which has already been described in the introduction to be used, i.e. for two discharge tube parts each to describe a helix shape and alternate in the axial direction. The discharge tube parts are then connected to one another at an end which, in operation, is remote from the electronic ballast. The tube piece according to the invention may expediently be fitted in the region of this connection between the two helical discharge tube parts.

The helix shape of the corresponding discharge tube parts, or of the one part in the case of a single helix, preferably continues all the way to the ballast-side discharge tube end. The corresponding discharge tube part therefore accordingly runs obliquely into the electronic ballast or into its housing. This procedure saves height, in particular since the electrodes can be arranged obliquely, is esthetically advantageous and finally also optimizes the ratio of discharge tube length and overall height.

In connection with the various references to the electronic ballast which have already been made, it should be explained that the invention does not relate only to a discharge lamp with an integrated electronic ballast, but also to a discharge lamp which, for example, can be plugged into a ballast of this type by plug connections. In both cases, however, the side which has been or is to be connected to the ballast can be differentiated from the other side and can therefore be used for the purposes of geometric description.

In particular if conventional exhaust tubes are absent from the region of the discharge tube ends on account of the tube piece according to the invention being used as an exhaust tube, the electrodes can be designed with a greater freedom of design and do not have to be made relatively long on account of parts of an exhaust tube projecting into the discharge tube. According to the invention, it is then preferable to dispense with additional stabilizing of the electrodes by means of an additional bead.

The Hg source which has already been mentioned a number of times may be a pure (elemental) Hg source, in particular when no outer bulb surrounding the helical discharge vessel is intended. On the other hand, the Hg source, in particular, may be an Hg-containing amalgam. Amalgams of this type are an inherent part of the prior art and are known to the person skilled in the art. In the present context, higher temperatures of the amalgam may have to be taken into account, depending on the lamp power and the thickness of the discharge tube structure compared to the tube piece according to the invention. This may be the case, in particular, with an outer bulb. Therefore, the design of the amalgam must be matched to the appropriate vapor pressure for a correspondingly increased amalgam temperature.

Amalgams of this type will be explained here for the sake of completeness. The invention is in principle based on a mercury amalgam for discharge lamps having a mercury fraction and a master alloy, characterized in that the master alloy corresponds to the general formula $$In_{a-e}X_b Y_c Z_d R_e$$

where:

X is at least one element selected from the group consisting of Ag, Cu, Sn,

Y is at least one element selected from the group consisting of Pb, Zn,

Z is at least one element selected from the group consisting of Ni, Te,

R comprises additions of Bi, Sb, Ga and standard residues, and where the following apply for a, b, c, d, e: $70\% \leq a \leq 98\%$, $b \leq 25\%$, $c \leq 25\%$, $d \leq 20\%$, $e \leq 15\%$, and where furthermore $2\% \leq b$ if $c=0\%$, $5\% \leq b$ if X is Cu, $d \leq 5\%$ if Z is Ni and $e \leq 5\%$ if R is Ga.

The temperature range which is of particular interest in this context is between 100° C. and 170° C. The inventors have discovered that mercury amalgams comprising what is known as a master alloy, i.e. the metal mixture or alloy which is to be processed with mercury to form the amalgam, in accordance with the above general formula and the following conditions, are eminently suitable for the temperature range referred to.

First of all, the invention is based on a relatively large amount of In being employed in the master alloy (with the term alloy in this context being understood in its general sense as a term encompassing a very wide range of types of metal mixtures, but in particular actual alloys). The In content is within the limits given above for the stoichiometric parameter a, i.e. between 70% and 98%. Furthermore preferred upper limits are 97.5% and 97%. Preferred lower limits are 75%, 80%, 85%, 90%, 92%. Here and in the text which follows, it is in each case the case that the numerical values given are increasingly preferable in the order given. Furthermore, these limits are always inclusive. Finally, details given in % in the present description and in the claims fundamentally refer to percent by mass.

In this context, it should be noted that the stoichiometry parameter a here still includes additions of in particular Bi, Sb and Ga of up to 15%, in the case of Ga of up to 5%. The actual lower limit for the true In content is therefore 55%.

The Bi, Sb or Ga additions do not significantly interfere with the invention but also do not themselves perform any important function.

The Ag, Cu and/or Sn contents summarized under X have the function of widening the melting range. This is achieved by introducing multiphase states in the master alloy. Particularly preferred in this context is Ag, and under certain circumstances also combinations with Cu and/or Sn. According to the invention, the corresponding stoichiometric parameter b is at most 25%. The upper limits of 20%, 15%, 12%, 10%, 8% are preferred. If the component Y, which is explained in more detail below, is not present, i.e. c=0%, b should be at least 2%. Furthermore, if Cu is selected for X, b should be at least 5%. Irrespective of this, in any case, the lower limits of 2%, 2.5%, 3% and 3.5% are preferred; b may also be below 2% or 0%, i.e. X can be substantially or completely absent, if component Y referred to below is present.

The component summarized as Y has the function of shifting the upper limit of the melting range toward higher temperatures. It is in this way possible, if desired, in particular to increase the upper limit of a typical usable vapor pressure range up to approx. 4 Pa from the order of magnitude of around 145° C. to 160° C. or 170° C. Pb is preferred over Zn in this context, since Zn can lead to blackening. According to the invention, the corresponding stoichiometry parameter c is less than 25%. Preferred upper limits are 20%, 18%, 16%, 14%, 12%, 10%. Since in very good master alloys it is even possible to dispense with Y altogether, specifically if there is no need to shift the upper limit of the melting range, the value 0% is particularly preferred according to the invention.

High values of over 20% are of particular interest at relatively high lamp powers of over 100 W. However, constituent Y is optional and not absolutely imperative for the invention.

Z symbolizes a further constituent combining Ni and Te, which, in metallic solution or an intermetallic compound, can create or improve pasty states of the amalgam. The corresponding increase in viscosity may be of relevance to the handling of the amalgam and/or to preventing it from dripping or running out of the intended location in the lamp. Ni or Te are of no real significance to the vapor pressure of the Hg or the amalgam formation. The usefulness of this addition is very much dependent on the way in which the amalgam is introduced into and mounted in the lamp.

Preferred values for stoichiometry parameter d are between 0% and 5% in the case of Ni and between 0% and 20% in the case of Te. In this case too, Zn can even be dispensed with altogether in very good master alloys. d=0% is therefore also a value which is preferred in accordance with the invention. If relatively large amounts of Te are provided, the In content should tend to be in the upper range, preferably over 80%, better 85% and even better 90%.

The Hg content itself, which is not considered part of the master alloy, is preferably between 3% and 20%. The lower limit of 3% does not form a significant reserve under normal circumstances, and consequently values of over 7% and better over 10% are preferred. Furthermore, it is preferable for the Hg content to be at most 15%.

These master alloys can be used to produce Hg amalgams which deliver favorable vapor pressures of approximately 0.5-4 Pa in the desired temperature range or part of it, with vapor pressures of between 1 and 2 Pa being preferred. The range from 0.5-0.7 Pa, on the one hand, up to approximately 4 Pa, on the other hand, corresponds to a light yield of at least 90%.

To return to the lamp itself, it should also be stated that the advantage according to the invention of the tube piece, and therefore the Hg source inside it, being heated up relatively quickly can be boosted still further by the tube piece, at least in part, being provided with an IR-absorbing surface. This allows the radiant heat of the discharge tube to be quickly taken up and released to the Hg source. However, in thermal equilibrium, temperatures which are substantially independent of the surface condition are established. These temperatures are merely reached more quickly by virtue of the measure outlined.

If the tube piece according to the invention is used to store the Hg source, in particular the Hg source which controls vapor pressure, or even merely serves to introduce the Hg source, in particular the Hg donor—which as mentioned is another possible way of using this tube piece—through a relatively large opening into the discharge vessel, it is preferable for only a single, cohesive part to be used as the Hg source, i.e. for example just a single ball of amalgam. This is readily possible on account of the cross-sectional areas available and considerably simplifies production of the lamp.

A preferred range for the external diameter of the tube piece according to the invention is at least 4 mm, for example 4-8 mm. Typical diameters of discharge tubes are ⅖, ⅜, ⅘ or even ⅝ inches, i.e. the order of magnitude of 6-16 mm. Therefore, the tube piece may be in the region of from half to the total diameter of the discharge tube.

The tube piece may preferably extend along at least 20% of the axial length of the helix shape. If it contains an Hg source, in particular an Hg source which controls the vapor pressure, this source is preferably arranged within 10-90% of the axial length, particularly preferably between 15-85% or 20-80% or 25-75% and most expediently 30-70% of the axial length. In other words: the Hg source is preferably located approximately in the center, with the corresponding tolerances, or at any rate preferably slightly removed from the edge of the helix shape in the sense of the axial direction.

Since the lamp according to the invention can be of very compact construction, it is preferably additionally provided with an outer bulb. The outer bulb brings the external appearance of the lamp close to that of conventional incandescent lamps, which is considered pleasing by customers. The helix shape according to the invention in conjunction with the space-saving accommodation of the Hg source or space-saving solution of the exhaust tube therefore overall makes it possible to achieve compact energy-saving lamps similar to incandescent lamps.

Moreover, the invention relates to a process for producing the lamp described, in which context all the individual features which have been disclosed hitherto and also those which are disclosed below in the context of the exemplary embodiment are also to be considered to have been disclosed in connection with the production process. This production process is in particular to include the main steps of producing an at least partially helical discharge tube from a tube piece (of corresponding length) by winding and fitting the tube piece according to the invention to this discharge tube. It is preferable for the tube piece to be used as an exhaust tube and also to introduce the Hg source.

Otherwise, the details of the production of compact fluorescent lamps of this type belong to the prior art and are known to the person skilled in the art and can also be employed in the present case.

BRIEF DESCRIPTION OF THE DRAWINGS

In the text which follows, the invention is explained by way of example with reference to the drawings, in which features disclosed are of relevance both to the process aspect and to the apparatus aspect of the invention and may also be pertinent to the invention in combinations other than those presented.

In detail, in the drawings:

FIG. 1b shows a variant to FIG. 1a, FIG. 2a shows a diagrammatic outline illustration of a discharge tube and tube piece according to the invention forming a compact fluorescent lamp as shown in FIG. 1a, FIG. 2b shows a variant of FIG. 2a, corresponding to FIG. 1b, FIG. 3 diagrammatically depicts the production of a compact fluorescent lamp according to the invention.

PREFERRED EMBODIMENT OF THE INVENTION

Figure 1A:
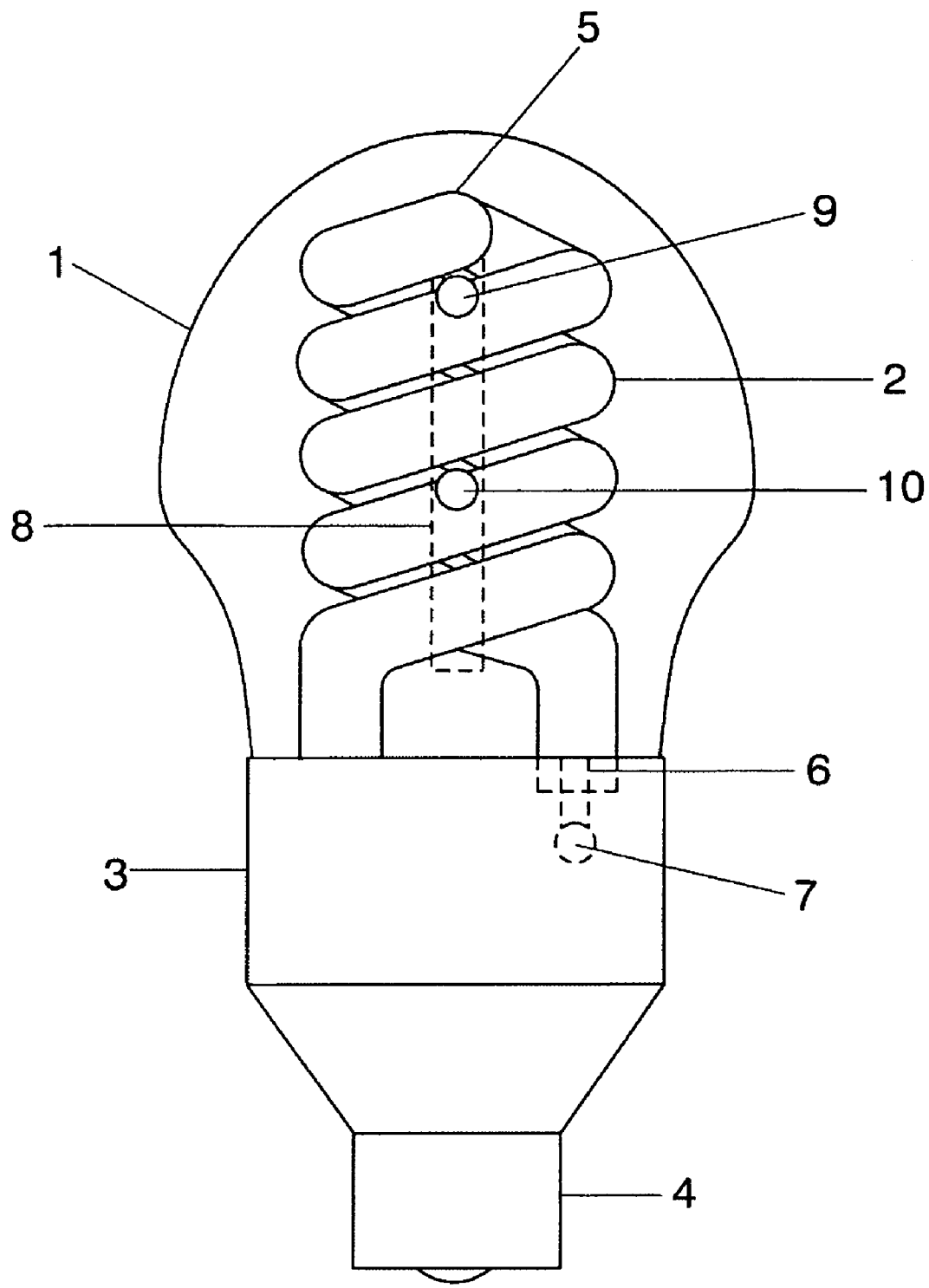
FIG. 1a shows a diagrammatic outline illustration of a compact fluorescent lamp clearly illustrating the invention as distinct from the prior art.

FIG. 1a shows an outline illustration of a compact fluorescent lamp, on the basis of which both the prior art and the invention are to be explained. The lamp has an outer bulb 1, which encloses a helically wound discharge tube 2. The discharge tube 2 is connected to an electronic ballast 3, only the housing of which is illustrated; the outer bulb 1 is also secured to this housing. On the opposite side from the outer bulb 1, the housing of the ballast 3 ends at a standardized lamp cap 4. To the extent that it has been described thus far, the lamp shown in FIG. 1a is conventional. The same also applies to the shape of the discharge tube 2, which has already been referred to above as a double helix and is wound in two discharge tube parts with two ends starting from the ballast to form a double helix with an alternating sequence of the helix turns of the two discharge tube parts. In an upper region, the two discharge tube parts merge into one another at a location denoted by 5.

FIG. 1a illustrates how compact fluorescent lamps of this type, despite having compact external dimensions and a shape very similar to that of conventional incandescent lamps, overall provide a relatively long discharge length.

Reference numeral 6 indicates a conventional exhaust tube fitting at one of the two discharge tube ends, the circle outlined by 7 being intended to illustrate that an Hg source which controls the vapor pressure, for example a ball of amalgam, may be provided here. Further details with which the person skilled in the art will in any case be familiar, such as the electrodes, fused seals or pinches, are not illustrated in more detail in this figure. However, FIG. 1a does illustrate that the exhaust tube fitting 6 conventionally has a significantly smaller diameter than the discharge tube 2. In fact, it also has to leave space for the electrodes, which is not shown here. Moreover, the exhaust tube fitting 6 projects into the discharge tube end on one side and on the other side projects from the discharge tube end into the ballast, so that a certain additional length is required both on the part of the discharge tube and on the part of the ballast (in the vertical direction as seen in FIG. 1a). In particular, the electrodes have to project beyond that part of the exhaust tube fitting 6 which projects into the discharge tube. In the prior art, they are often stabilized by an additional glass bead.

Finally, it will be clear that the temperature of the Hg source 7 accommodated in the exhaust tube fitting 6 is highly dependent on the ambient temperature in the ballast housing, which in turn is dependent on the external ambient temperature, the operating time and also the installation position of the lamp.

The line which is shown in dashed lines and is designated by 8 illustrates a tube piece according to the invention, which is fitted to the discharge tube 2 in the region of the connection 5 between the two discharge tube parts and extends axially and straight downward from this uppermost, axial position with respect to the helix. In this case, it substantially takes up the axial length of the helix shape.

Positions 9 and 10, which are each marked by a circle, illustrate two possible examples of the arrangement of an Hg source which controls the vapor pressure in the tube piece 8 according to the invention. One position 9 is located slightly below the connection 5 of the discharge tube parts, i.e. already within the interior of the helix, but in the upper region thereof. The other position 10 is located approximately in the center of the helix, as seen in the axial direction (with the helix extending from the lower bend of the discharge tube parts up to the connecting position 5). At both positions, but in particular at the preferred position 10, the temperature of an Hg source in the helix is substantially determined by the radiation originating from the discharge tube 2, since it is to a certain extent enclosed by the helical discharge tube 2. This approximately equates to a radiating cylinder jacket.

With respect to the axial length of the helix, the position 9 should be at a good 20% and position 10 at a good 50%. Both positions show the advantage of rapidly reaching the final temperature after the cold lamp has been switched on. Both positions are significantly less sensitive to fluctuations in the ambient temperature and changes in the installation position compared to the prior art. However, position 10 is even less dependent on the orientation of the lamp in operation, i.e. on the question of whether the discharge tube 2 is arranged at the top, the side or the bottom with respect to the ballast 3 in operation, and on the different convection conditions which result.

It can also be seen from FIG. 1*a* that the exhaust tube function can likewise be performed by the tube piece 8 according to the invention, specifically via its lower end as seen in FIG. 1*a*. It not only provides a large exhaust cross section, since it is not fitted into the discharge tube 2 and does not have to take account of electrodes and other parts, but also it is readily accessible. Finally, the tube piece 8 according to the invention, if desired, can also be used in combination with conventional exhaust tubes 6 for purging operations and the like, and can moreover (independently of conventional exhaust tubes 6) serve as a holder, for example if fuse seals or pinches are arranged at the lower ends of the discharge tube 2.

FIG. 1*b* shows a variant of FIG. 1*a*, with the same reference numerals used for corresponding parts of the lamp, although not all the details are shown. Unlike in FIG. 1*a*, this is a lamp without an outer bulb and in which, moreover, the discharge tube ends in the double helix shape run into the cap 4. For comparison purposes, reference is made to FIG. 2*b*, which is described below. It will be clearly apparent that the lamp shown in FIG. 1*b* is of particularly compact structure.

FIG. 2*a* shows a discharge tube 2 corresponding to FIG. 1*a*, with a tube piece 8 which is similar to FIG. 1*a* and once again runs axially through the interior of the helix shape. In addition, FIG. 2*a* diagrammatically depicts electrodes 11 at the discharge tube ends. However, the outer bulb 1, the ballast 3 and the cap 4 are not included in the drawing.

In this case, the tube piece 8 does not extend over the entire length of the helix, but rather only over approximately ¾ thereof. It includes a fused glass seal 12, which serves to prevent a retaining body in the form of an iron pill 13 from dropping into the discharge tube 2. The iron pill 13 in turn, on account of surface tension effects and because it blocks a large part of the cross section of the tube piece 8, prevents an amalgam ball 14 from dropping into the discharge tube 2. The amalgam ball 14 as the Hg source is in this example located approximately between 60 and 70% along the axial length of the helix (as measured from the top). The use of the iron pill 13 as a retaining-body in particular enables the fused seal 12 to be configured in such a way that before the iron pill 13 and the amalgam ball 14 are put in place, it provides a good exhaust cross section through the tube piece 8 if the latter is used as an exhaust tube. This is because the iron pill 13 and the amalgam ball 14 are only introduced after all the process steps of purging, exhaust pumping, forming, etc. have been concluded. After it has been used as an exhaust tube, the tube piece 8 is closed off at its lower end by being fused together, as is intended to be indicated by the shape of the end designated by 15. Before it is closed up, the iron pill 13 and amalgam ball 14 have been inserted and then trapped in the space between the closure 15 and the fused seal 12. The statements which have been made in connection with position 10 in FIG. 1*a* also apply to the positioning of the amalgam ball. In the region of the amalgam ball 14, the tube piece 8 has an IR-absorbing outer coating (not shown).

FIG. 2*b* shows a variant of FIG. 2*a*, corresponding to the lamp shown in FIG. 1*b*, with the same reference numerals used once again.

Figure 3:
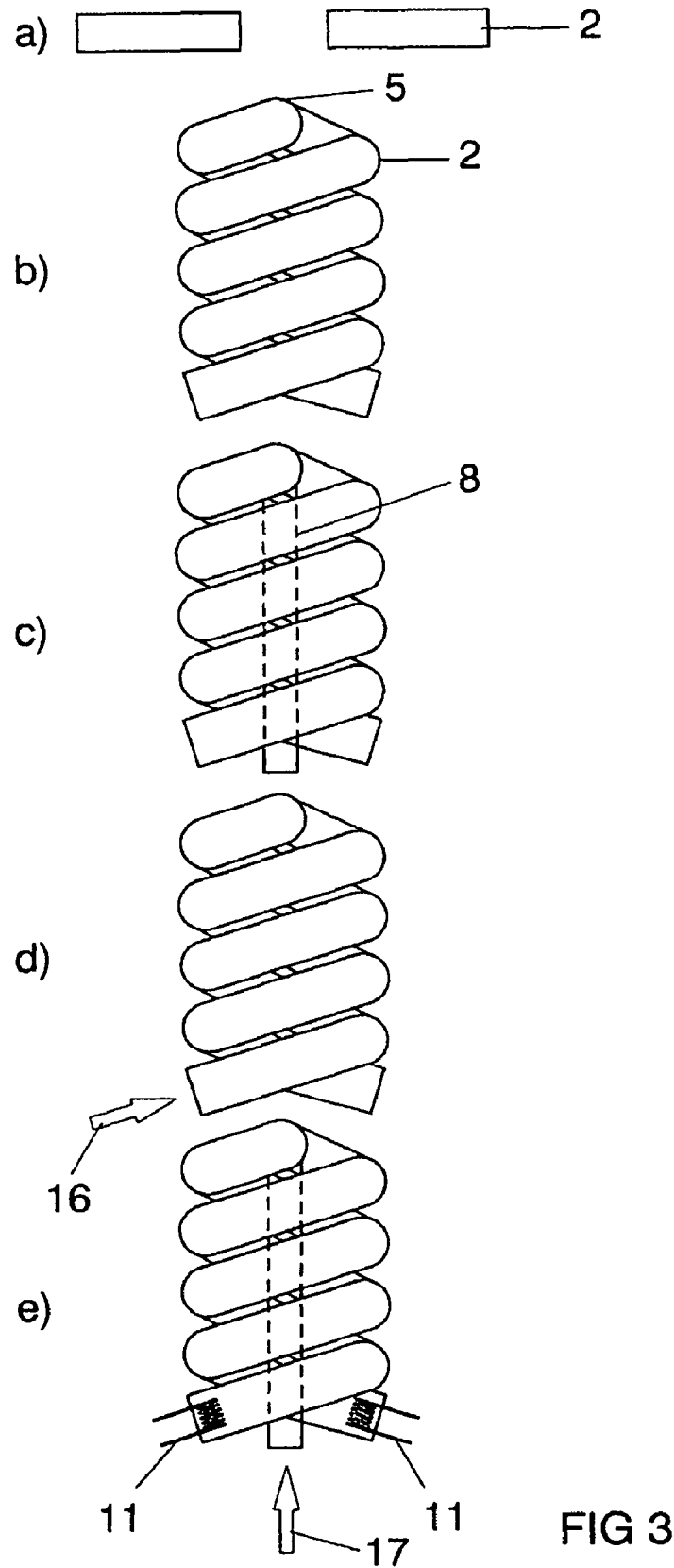

FIG. 3 illustrates the production of the compact fluorescent lamp as shown in FIG. 2*a*. It should be noted that the production is completely conventional. In a first step, designated "a", a suitable glass tube piece 2 is cut to length as the discharge tube, and in a step designated "b" this glass tube piece 2 is wound to form a double helix in a manner which is known per se. The vertex of the helix, which is designated by 5 and has hitherto been referred to as the connection between two discharge tube parts, only forms a connection in geometric terms, but it is not the case, for example, that two tube pieces which were previously separate are actually physically connected to one another there. In a step designated "c", a further tube piece 8 is fitted to the discharge tube 2 at this vertex 5. Step "d", by means of arrow 16, symbolizes introduction of phosphor, which is known per se, on the inner walls of the discharge tube 2 by means of a suspension. Finally, step "e" shows the introduction of the electrodes 11, after which the corresponding discharge tube ends are closed and the discharge vessel is evacuated and, in accordance with arrow 17, filled through tube piece 8.

Further conventional tube fittings are not provided. Moreover, the discharge tube 2 shown in FIG. 3*e* also differs from that shown in FIGS. 1*a* and 2 by virtue of the fact that the discharge tube ends are not bent straight downward. Rather, the purely symbolic illustration in FIG. 3*e* is intended to serve as a reminder that the discharge tube ends may also merge obliquely, as a continuation of the helix shape, into the housing of the ballast in accordance with FIG. 1*a*, which saves considerable height. Also, the electrodes within the discharge tube ends can be kept relatively short, since here there is no need to take account of a conventional pump tube fitting. There is also no need to use a stabilizing bead.

In this exemplary embodiment, the discharge tube 2 is what is known as a T3 tube, i.e. with an external diameter of ⅜ inch (9.525 mm). The external diameter of the tube piece 8 is approximately 6 mm.

Figure 4:
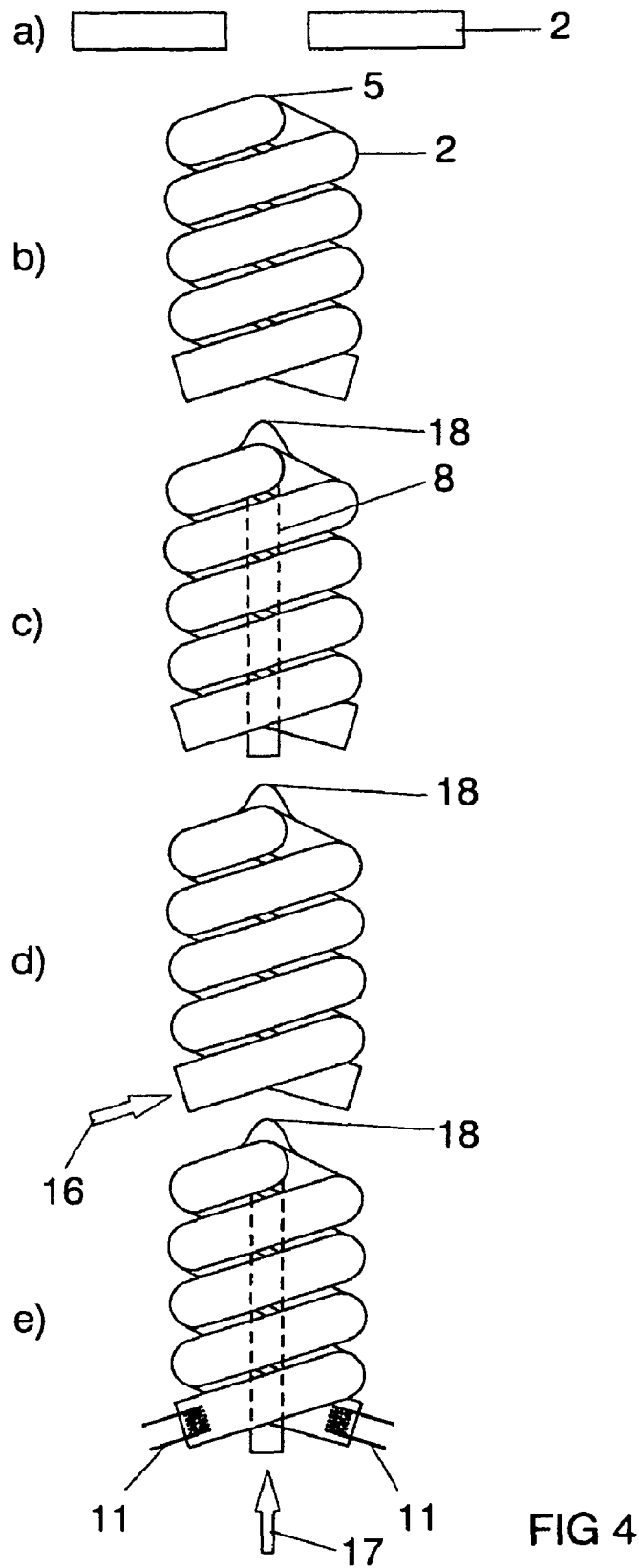
FIG. 4 shows a variant of FIG. 3.

FIG. 4 in turn shows a variant of FIG. 3. Unlike in FIG. 3, in this case the vertex 5 is locally heated following production of the double helix shape in step b, and the discharge tube 2 is placed under gas pressure. As a result, a protuberance designated 18, namely what is known as a cold spot, is formed. This exemplary embodiment therefore shows a lamp in which the vapor pressure control of the Hg is effected not by means of the temperature in the tube piece 8, but rather by means of the temperature of the cold spot in a manner which is known per se. The exemplary embodiment therefore illustrates that the invention does not necessarily imply the use of the tube piece 8 as an element which determines the vapor pressure for an Hg source. Rather, in this last exemplary embodiment, the discharge tube 8 is used on the one hand, in the manner which has already been outlined, as an exhaust tube and, furthermore, to hold the discharge vessel during production of the lamp. Furthermore, it can be used to introduce the Hg source. However, unlike in the previous exemplary embodiments, it is ultimately the cold spot 18 which determines the Hg vapor pressure when the lamp is operating.

A conventional Hg source is used in this exemplary embodiment.

In the previous exemplary embodiments, an amalgam which is designed for correspondingly high temperatures may be suitable for the reasons which have already been outlined, in particular, in the case of the exemplary embodiment from FIGS. 1*a* and 1*b*. In the present case, two tried-and-tested examples should be mentioned. The first of these is an amalgam made up of three parts by weight of Hg in combination with 97 parts by weight of a master alloy composed of 90 parts by weight of In and 10 parts by weight of Pb, the master alloy being described as $In_{90}Pb_{10}$. It should be noted that in this case the presence of Pb means that no Ag was used. An alternative is formed by an amalgam made up of 10 parts by weight of Hg together with 90 parts by weight of a master alloy made up of 96 parts by weight of In and 4 parts by weight of Ag, in which case, therefore, the master alloy is referred to as $In_{96}Ag_4$. In this case, an addition of Pb was not considered necessary to set a suitable vapor pressure, although such an addition could facilitate matching to even higher operating temperatures. In both examples, no Ni or Te was added, since the amalgam in the form selected here of an introduced ball 14 does not present any handling difficulties. In other cases, a viscosity which is too low can lead to problems with dripping or the like, so that the addition of Ni or Te then becomes desirable.

The invention claimed is:

1. A gas discharge lamp having a discharge tube which is at least partially wound helically around an axial free space, and a tube piece which branches off from the discharge tube, wherein the tube piece extends inside the helix shape, the tube piece forming a space separate from the discharge tube, wherein the tube piece contains at least one Hg source.

2. The gas discharge lamp as claimed in claim 1, in which the tube piece has been used as an exhaust tube.

3. The gas discharge lamp as claimed in claim 1, in which the tube piece is fitted to one end of the helix shape of the discharge tube and from there extends substantially axially parallel within the helix shape.

4. The gas discharge lamp as claimed in claim 1, in which two discharge tube parts form a double helix shape and merge into one another at one end of the double helix shape.

5. The gas discharge lamp as claimed in claim 1, in which the helical discharge tube part(s) of the helix shape end(s) at a corresponding inclination in a connection for an electronic ballast.

6. The gas discharge lamp as claimed in claim 1, in which holders of the electrodes at the ends of the discharge tube are designed without separate stabilizing beads.

7. The gas discharge lamp as claimed in claim 1, in which the Hg source is an amalgam.

8. The gas discharge lamp as claimed in claim 1, in which the tube piece for the Hg source is provided with an IR-absorbing surface.

9. The gas discharge lamp as claimed in claim 1, in which the tube piece has an external diameter of at least 4 mm.

10. The gas discharge lamp as claimed in claim 1, in which the tube piece extends along at least 20% of the axial length of the helix shape.

11. The gas discharge lamp as claimed in claim 1, in which the Hg source is located within 10-90% of the axial length of the helix shape.

12. The gas discharge lamp as claimed in claim 1, which has an outer bulb which encloses the discharge tube and the tube piece.

13. A process for producing the gas discharge lamp as claimed in claim 1, comprising the steps of: winding a discharge tube to form the helix shape, and fitting the tube piece to the discharge tube such that the tube piece branches off from the discharge tube to extend inside the helix shape in a way that the tube piece forms a space separate from the discharge tube, wherein the tube piece contains at least one Hg source.

14. The gas discharge lamp as claimed in claim 7, in which the amalgam is an Hg source which controls vapor pressure and is provided in the form of precisely one cohesive body.

15. The process as claimed in claim 13, comprising the additional step of:

evacuating the discharge tube through the tube piece for the Hg source.

* * * * *